M. G. FAGAN.
Hot-Air Furnace.

No. 104,842.

Patented June 28, 1870.

Witnesses.

Inventor

M. G. FAGAN.
Hot-Air Furnace.

No. 104,842. Patented June 28, 1870.

Witnesses.

Inventor.
Michel G. Fagan
by Prindle and Tyler
Attys.

M. G. FAGAN.
Hot-Air Furnace.

No 104,842.   Patented June 28, 1870.

Witnesses.                    Inventor.

M. G. FAGAN.
Hot-Air Furnace.

No. 104,842.                    Patented June 28, 1870.

Witnesses.
A. C. L. Merle
Chas. N. Poole

Inventor.
Michel G. Fagan
by Prindle & Dyer
Attys.

N. PETERS, PHOTO-LITHOGRAPHER, WASHINGTON, D. C.

United States Patent Office.

MICHEL G. FAGAN, OF TROY, NEW YORK, ASSIGNOR TO HIMSELF AND ALBERT C. CORSE, OF SAME PLACE.

Letters Patent No. 104,842, dated June 28, 1870.

HOT-AIR FURNACE.

The Schedule referred to in these Letters Patent and making part of the same

*To all whom it may concern:*

Be it known that I, MICHEL G. FAGAN, of Troy, in the county of Rensselaer and in the State of New York, have invented certain new and useful Improvements in Hot-air Furnaces; and do hereby declare that the following is a full, clear, and exact description thereof, reference being had to the accompanying drawing making a part of this specification, in which—

Letters of like name and kind refer to like parts in each of the figures.

Figure 1:
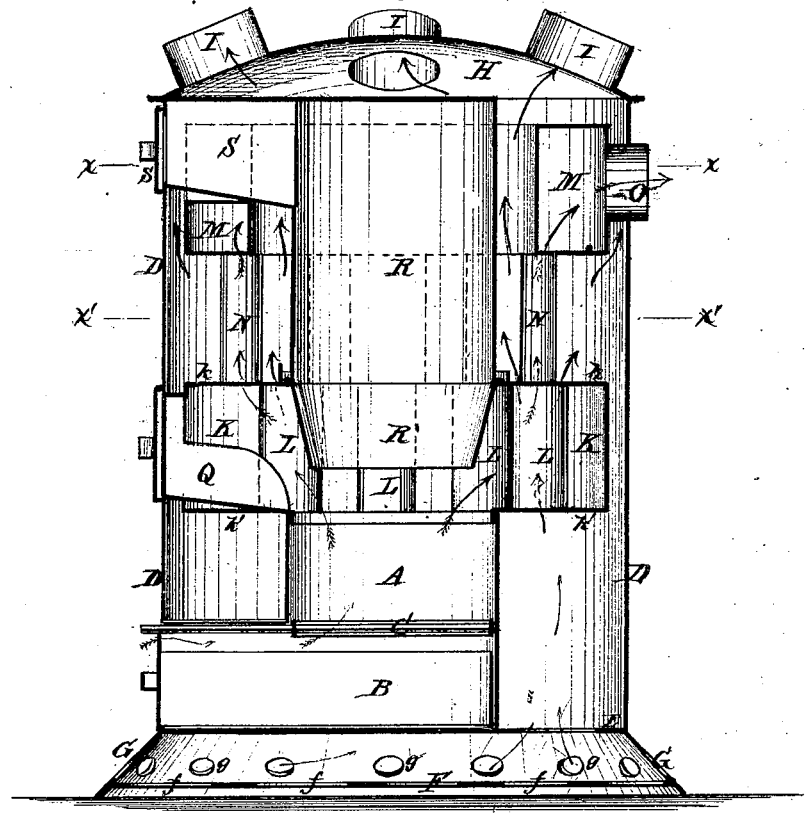
Figure 1 is a vertical central section of my heater, when arranged as a base-burner.
Figure 2:
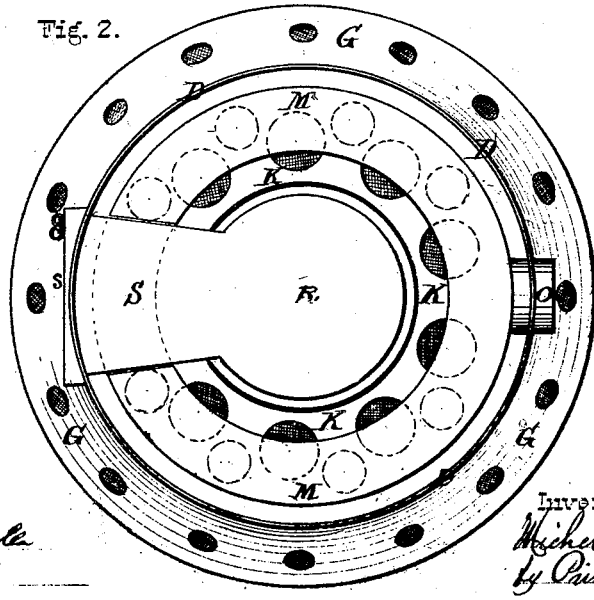
Figure 2 is a plan view of the upper end of the same with the top plate of the casing removed.
Figure 3:
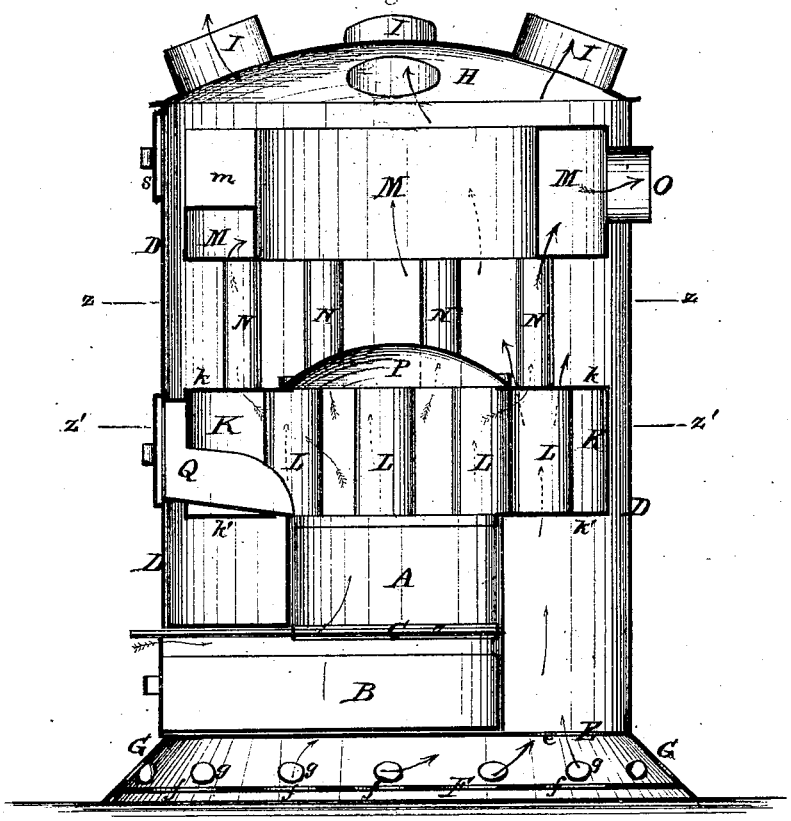
Figure 3 is a vertical central section of said heater when arranged as a surface burner.
Figure 4:
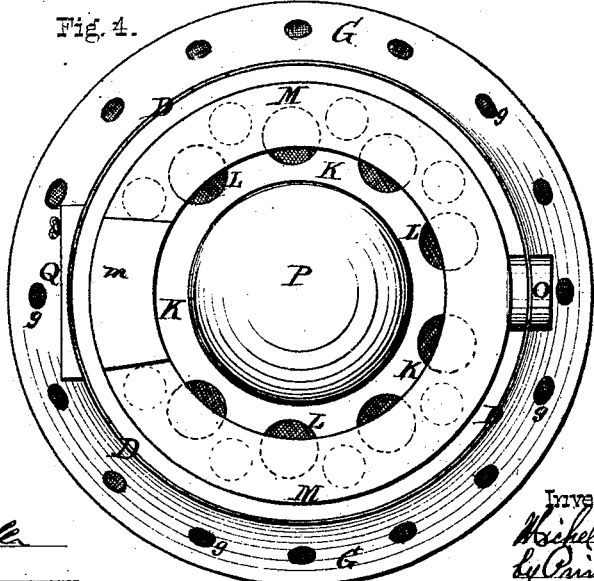
Figure 4 is a plan view of the upper end of the same with the top plate of the casing removed.
Figure 5:
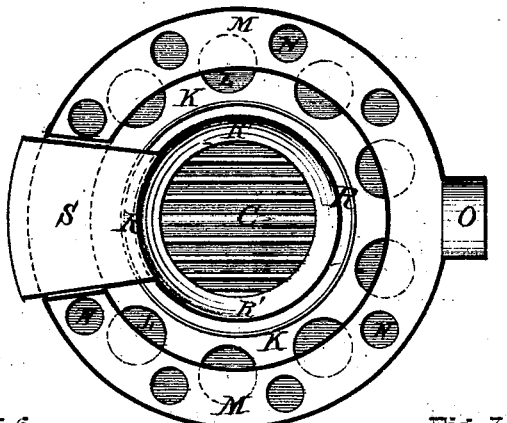
Figures 5 and 6 are horizontal sections on the lines $x'$ and $x'$, respectively, of figs. 1 and 9.
Figure 6:
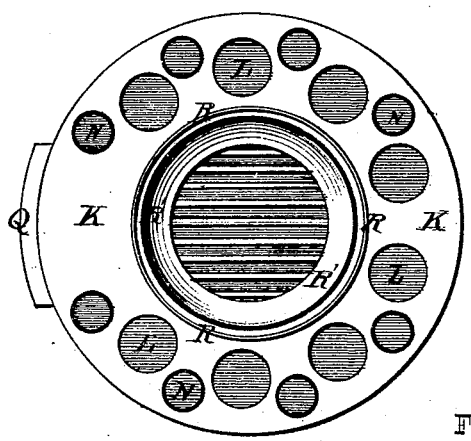
Figure 7:
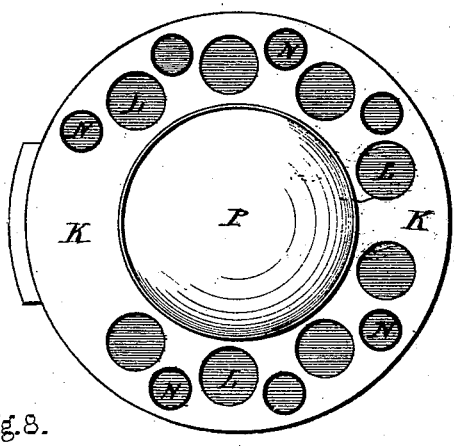
Figures 7 and 8 are like views on the lines $z$ and $z'$, respectively, of figs. 3 and 10.
Figure 8:
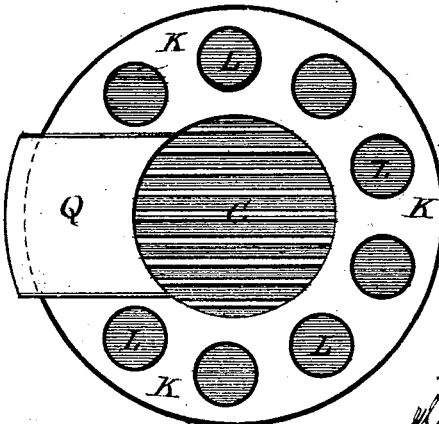

My invention is an improvement in hot-air furnaces, and

It consists, principally, in the peculiar construction and arrangement of two drums placed immediately above the fire-pot, and connected together by means of smoke-flues or pipes, as is hereinafter set forth.

It also consists in the peculiar construction of the magazine and drums, by means of which the heater can be readily arranged for use as a base-burner or as a surface burner.

In the annexed drawing—

A represents a fire-pot constructed in the form of a straight cylinder, the lower end of which rests upon and is attached to an ash-pit, B, and is provided with a pivoted or dumping-grate, C, of usual form.

The ash-pit B, corresponding in width to the diameter of the fire-pot A, and having a length sufficient to permit it to project to the outside of the casing D, is secured to or upon a circular plate, E, the latter of which is placed in a horizontal position a short distance above a second plate, F, somewhat larger than the first, and both secured together by means of a flaring metal ring, G, said plates and ring forming the base upon which the heater rests.

The casing D consists of a straight cylinder of sheet metal, corresponding in size and shape with, and attached to, the plate E; from whence it extends upward to a sufficient height to contain the internal portions of the heater, and has its upper end inclosed by means of a convex cover, H, which receives the hot-air pipes I. Suitable openings for the removal of ashes, for supplying fuel, and for the passage of the smoke flue are provided in and through the casing, as is hereinafter shown.

Resting upon and secured to the upper end of the fire-pot A, is a cylindrical drum, K, forming the combustion-chamber, which has the general size and shape shown in the drawing, and is provided with openings through its top and bottom plates, $k$ and $k'$, respectively, corresponding in size with the upper end of said fire-pot.

A series of pipes, L, passing vertically through said drum, midway between its vertical wall and the fire-pot, permits the passage of external air, and gives greater heating capacity to the combustion-chamber.

A second drum, M, having an annular form, and corresponding in size with the drum K, is placed a short distance above and connected with the latter by means of a number of small pipes or flues, N, which permit the heated escaping products of combustion to enter said drum M, from whence they pass outward through the exit-pipe O, extending horizontally rearward.

When used as a surface burner, the opening within the upper side of the drum or combustion-chamber K is closed by means of a corresponding convex plate, P, and fuel is introduced to the fire-pot through a suitable opening, Q, provided in and through the front side of said combustion-chamber, and closed by a door; but when used as a base-burner, said cover or plate P is removed, and a magazine, constructed as hereinafter described, is substituted therefor.

Figure 9:
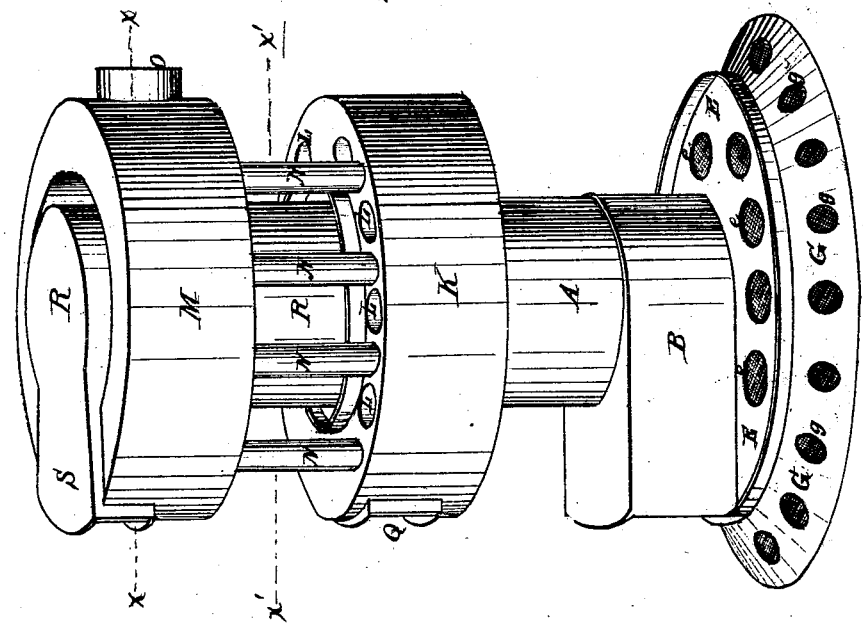
Figure 9 is a perspective view of the heater as arranged for base-burning, with the casing removed.

As seen in figs. 1 and 9, the magazine consists of a straight metal cylinder, R, corresponding in diameter with the opening within the upper end of the combustion-chamber, and having a height sufficient to bring its upper end somewhat above the drum M.

The lower end of the magazine is provided with a contracted mouth, R', which projects downward within the combustion-chamber, while its upper end is inclosed, except at the front, where a suitable chute, S, is connected, which chute, extending outward to or beyond the casing, is provided at its outer end with a door, $s$, and furnishes a means for supplying said magazine with fuel.

A narrow flange, $r$, projecting horizontally outward from the lower end of the parallel walls of the magazine R rests upon the upper end of the drum K, and supports said magazine in a vertical position when placed within the opening left in the upper end of said drum by the removal of the dome-shaped plate or cover P.

In order that the style of the heater may be changed when desired, the cover H of the casing is removed, the magazine R or cover P substituted, one for the other, and a tight joint produced between the remaining part and the contiguous portion of the drum K by means of a packing of fine sand or clay.

Figure 10:
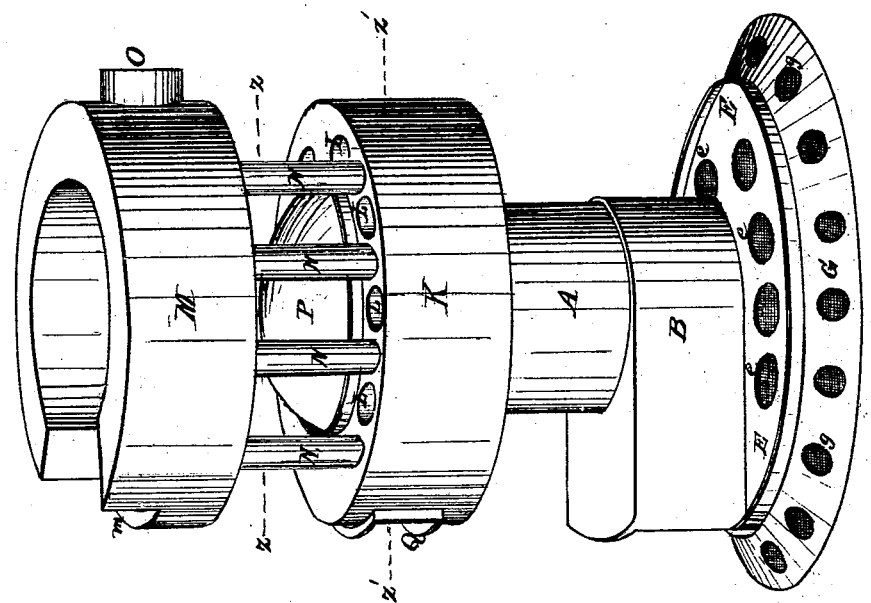
Figure 10 is a like view of the same as arranged for surface burning.

In order to accommodate the chute S, a corresponding inclosed recess, $m$, is provided within the front of the drum M, as shown in fig. 10.

The heating devices are now complete, and it only remains to provide for the admission thereto of a sufficient supply of pure air, which is accomplished by means of a series of openings, $g$, passing through the ring G, and other openings, $e$ and $f$, provided in and through the plates E and F respectively.

The fire-pot being supplied with fuel, either from the magazine or through the door Q, and said fuel ignited, the air required for combustion enters through the ash-pit and grate, while the heated escaping products of combustion pass upward from the fire-pot, through the chamber K, the pipes N, the drum M, and the exit-pipe O, into the chimney.

The air to be heated enters the casing through the openings within the base, and from thence passes upward around the drums K and M, and through the pipes L, from which, by reason of the large heating surface exposed, said air receives a high degree of temperature before escaping through the flues I.

The especial advantages possessed by this invention are:

First, by means of the especial construction and relative arrangement of the drums, their connecting-pipes, and the air-pipes through the lower drum or combustion-chamber, a very large heating-surface is secured, while at the same time the parts are not complicated, and are comparatively inexpensive.

Second, the relative construction and arrangement of the drums and the magazine enables the heater to be quickly and easily prepared for use, either as a surface or a base-burner, as may be desired.

Third, the general construction and arrangement of the various parts of the device are such as to produce a heater that, while efficient and durable, can be furnished at a less cost than others having an equal capacity.

Having thus fully set forth the nature and merits of my invention,

What I claim as new is—

The means employed for rendering the heater convertible at will into a surface or a base-burner, consisting of the drum K, provided with the open-top plate $k$, for the reception of, and in combination with, the interchangeable cover P and magazine R, substantially as shown and described.

Also, the magazine R, constructed as shown, and combined with the drum or combustion-chamber K, in the manner and for the purpose specified.

Also, the combination of the drums K and M with the magazine R, substantially as shown and for the purpose described.

Also, the hereinbefore described furnace, consisting of the fire-pot A, the ash-pit B, the drum K, provided with the pipes L, the drum M, the pipes N, and the cover P, or magazine R, all inclosed within or by the casing D, substantially as and for the purpose specified.

In testimony that I claim the foregoing, I have hereunto set my hand this 30th day of May, 1870.

MICHEL G. FAGAN.

Witnesses:
GEORGE C. BALDWIN, Jr.,
AUG. P. CORSE.